US008321337B2

(12) United States Patent
Fenlon et al.

(10) Patent No.: US 8,321,337 B2
(45) Date of Patent: Nov. 27, 2012

(54) INTERNET-CONNECTED DEVICES

(75) Inventors: Peter Fenlon, York (GB); Andrew Davies, Leeds (GB); Kenneth Tindall, York (GB)

(73) Assignee: Live Devices Limited, York (GB)

( * ) Notice: Subject to any disclaimer, the term of this patent is extended or adjusted under 35 U.S.C. 154(b) by 2805 days.

(21) Appl. No.: 10/191,876

(22) Filed: Jul. 8, 2002

(65) Prior Publication Data

US 2003/0093374 A1 May 15, 2003

Related U.S. Application Data

(60) Provisional application No. 60/310,916, filed on Aug. 8, 2001.

(30) Foreign Application Priority Data

Jul. 6, 2001 (GB) .................................. 0116550.5

(51) Int. Cl.
*G06Q 40/00* (2012.01)
*G06F 17/00* (2006.01)
*G06F 7/00* (2006.01)

(52) U.S. Cl. ................ 705/39; 705/35; 705/40; 705/41; 705/42; 705/44; 707/702; 707/703; 707/760

(58) Field of Classification Search ...................... 705/35, 705/39–42, 44; 707/702, 703, 760
See application file for complete search history.

(56) References Cited

U.S. PATENT DOCUMENTS

| 5,335,346 A | 8/1994 | Fabbio ........................... 395/600 |
| 5,787,428 A | 7/1998 | Hart ................................... 707/9 |
| 5,974,418 A | 10/1999 | Blinn et al. |
| 6,073,242 A | 6/2000 | Hardy et al. .................. 713/201 |
| 6,158,010 A | 12/2000 | Moriconi et al. ............. 713/201 |
| 6,249,873 B1 | 6/2001 | Richard et al. ................ 713/200 |
| 6,529,948 B1 * | 3/2003 | Bowman-Amuah .......... 709/217 |
| 2001/0021929 A1 | 9/2001 | Lin et al. ............................ 707/2 |

FOREIGN PATENT DOCUMENTS

| CA | 2228687 | 8/1999 |
| EP | 0 809 198 | 11/1997 |
| EP | 0 942 568 | 9/1999 |

(Continued)

OTHER PUBLICATIONS

W. Richard Stevens, TCP/IP Illustrated, 1994, Addison Wesley Longman, Inc., vol. 1, pp. 462-465, and 34-37.*

(Continued)

*Primary Examiner* — Ella Colbert
*Assistant Examiner* — Scott S Trotter
(74) *Attorney, Agent, or Firm* — Sheridan Ross P.C.

(57) ABSTRACT

There are disclosed methods and systems for identifying an embedded device to a server system so as to provide an improved permission and billing relationship. The invention enables transaction activities by networked devices, each device being connectable to at least one server and associated with at least one stakeholder, wherein each device and each stakeholder has a unique identifier, and wherein there is provided a plurality of electronic certificates each owned by a stakeholder or on behalf of a device, the certificates being held on the at least one server and comprising a data structure which, when interpreted by the at least one server, determines whether a particular device acting on behalf of a particular stakeholder is entitled to carry out a transaction.

8 Claims, 3 Drawing Sheets

FOREIGN PATENT DOCUMENTS

| | | |
|---|---|---|
| GB | 2 366 700 | 3/2002 |
| GB | 2 369 904 | 6/2002 |
| WO | WO 99/36854 | 7/1999 |
| WO | WO 01/01294 A2 | 1/2001 |
| WO | WO 01/48591 | 7/2001 |

OTHER PUBLICATIONS

Stephen Wynkoop, Using Microsoft SQL Server 7.0, 1999, Que, pp. 356-362.*

Robert Lafore, Microsoft C Programming for the PC, 1989, The Waite Group, Inc., Second Edition, pp. 33-43 and 620-621.*

Dr. Richard Grimes, Professional DCOM Programming, 1997, Wrox Press Ltd., 113-116 and 512-514.*

Howard et al.; "Bringing the Internet to All Electronic Devices"; *Proceedings of the Embedded Systems Workshop*; Mar. 29, 1999, 12 pgs. total.

Johnston et al.; "Authorization and Attribute Certificates for Widely Distributed access Control"; *IEEE 7th International Workshops on Enabling Technologies: Infrastructure for Collaborative Enterprises—WETICE*; Jun. 28, 1998, pp. 1-6.

Jordan; "An object database for embedded environments"; *Java Report*; Apr. 1, 2000; pp. 54, 56, 57 and 58.

Taylor; "Embedded Systems n-Formation"; *Java Report*; Oct. 1999; pp. 1-4.

Thompson et al.; "Certificate-based Access Control for Widely Distributed Resources"; *Usenix, Proceedings of the 8th Usenix Security Symposium*; Aug. 23, 1999; 13 pages total.

Jean et al., "Using Some Database Principles to Improve Cooperation in Multi-Application Smart Cards"; Proceedings of 14th Euromicro conference on Real-Time Systems 2002.

* cited by examiner

INTERNET-CONNECTED DEVICES

CROSS REFERENCE TO RELATED APPLICATIONS

This application claims priority from UK patent application No. 0116550.5, filed on 6 Jul. 2001, now UK Patent No. GB2377287, and from U.S. Provisional Patent Application No. 60/310,916 filed in Aug. 8, 2001 entitled "Improvements Relating to Internet-Connected Devices" now expired. The entire disclosure of the U.S. provisional application is considered to be part of the disclosure of the accompanying application and is hereby incorporated by reference.

FIELD OF THE INVENTION

The present invention relates to a method and system for identifying an embedded device to a server system so as to provide an improved permission and billing relationship.

BACKGROUND OF THE INVENTION

Recently, there has been much development in the field of embedded devices adapted to be connected to the Internet or similar. An embedded device is generally in the form of a microcontroller or the like adapted to interact with a larger server or servers, thereby allowing a device (such as a vending machine, domestic electric appliance, motor vehicle etc) to be remotely controlled and/or monitored from a central server by way of a standard protocol such as Internet Protocol. A major difficulty with embedded devices is that they generally comprise microcontrollers or the like with very limited RAM and ROM. Communicating embedded devices are often required to take part in client-server transactions with complex permission and billing relationships. A typical microcontroller for use as an embedded device may have 32 kB of ROM and 1 kB of RAM, which is not enough to support the usual client-server protocols such as SOAP (Simple Object Access Protocol) or CORBA (Common Object Request Broker Architecture). The characteristics of these devices are such that conventional implementations (such as those described in Gary R Wright and W Richard Stevens, "TCP/IP Illustrated Volume 2: *The Implementation*", Addison-Wesley Professional Computing Series, 1995) of Internet Protocols ("IP") and the layered protocols such as Transmission Control Protocol ("TCP") or User Datagram Protocol ("UDP"), as well as higher-level application protocols such as HTTP, FTP, Telnet etc. are not feasible as they would demand more RAM or ROM than is typically available on the device. Embodiments of the present invention seek to provide techniques that enable such restricted devices to take part in complex permission and billing relationships and to interact with relational databases.

Techniques for enabling feature-rich communication to and from embedded devices are discussed in more detail in the present applicant's UK patent application no 0116549.7 entitled "Improvements relating to reduction of resource usage in TCP/IP implementation", the full disclosure of which is hereby incorporated into the present application by reference.

SUMMARY OF THE INVENTION

Communicating embedded devices are often required to take part in transactions with complex permission and billing relationships. The present invention is not restricted to the use of embedded devices, but extends generally to any networked device.

For ease of reference, the following terms as hereinbelow defined are used in the present application:

| | |
|---|---|
| "device": | a computer system making transaction requests to servers |
| "server": | a computer system capable of authenticating and processing transaction requests |
| "transaction type": | a type of work that a device may ask a server to perform on its behalf. Examples of transaction types could include "serve a web page", "send an SMS message", "return the time in UTC". |
| "transaction": | a request made by a device for a server to perform the work described by a transaction type on some supplied parameter data |
| "stakeholder": | an individual or legal entity that has some interest in the operation of a device (for example, the owner, the manufacturer, a retailer, a service organisation) |
| "device account": | funds apportioned by a stakeholder to support payment for transactions made by that device on behalf of that stakeholder |
| "certificate": | a data structure which when interpreted by the server determines whether a particular device acting on behalf of a stakeholder is entitled to carry out a transaction |
| "stakeholder account": | funds under the control of a stakeholder but not yet committed to any one device account |

The present applicant has invented a model in which simple identification of the embedded device to our server system then allows the permissions and a micro-payment billing system to be implemented within the server.

According to a first aspect of the present invention, there is provided a method of enabling transaction activities by networked devices, each device being connectable to at least one server and associated with at least one stakeholder, wherein each device and each stakeholder has a unique identifier, and wherein there is provided a plurality of electronic certificates each owned by a stakeholder or on behalf of a device, the certificates being held on the at least one server and comprising a data structure which, when interpreted by the at least one server, determines whether a particular device acting on behalf of a particular stakeholder is entitled to carry out a transaction.

According to a second aspect of the present invention, there is provided a system for enabling transaction activities by networked devices, the system comprising a plurality of devices each being connectable to at least one server and associated with at least one stakeholder, each device and each stakeholder having a unique identifier, and wherein there is provided a plurality of electronic certificates each owned by a stakeholder or on behalf of a device, the certificates being held on the at least one server and comprising a data structure which, when interpreted by the at least one server, determines whether a particular device acting on behalf of a particular stakeholder is entitled to carry out a transaction.

The present applicant has developed a permissions model by which stakeholders can grant and revoke permissions (to carry out transactions and certain other operations) to other stakeholders and to embedded devices in which they hold a stake (i.e. for which they have appropriate permissions). Permissions are implemented by "holding" certificates which themselves carry the permissions.

Certificates are held on the server and used on behalf of the embedded device or stakeholder to which they "belong". This means that:

Stakeholders/devices merely authenticate themselves to the server by unique identifiers and shared secrets that can be programmed in during manufacture.

The device and stakeholder identifiers remain constant throughout their lifespan, but, since the certificates are never stored on the device, the range of operations which any device or stakeholder can perform can vary over the lifetime of the device.

No knowledge/handling of certificates/permissions is required by stakeholders/devices. No knowledge of the identities of other parties involved in operations is required: possession of a certificate with the correct permissions is sufficient to take part in transactions and other operations. This enables the granting and revocation of permissions entirely on the server side without any knowledge or intervention on the part of the device.

This model, where the complex operations are contained within the server, allows simple symmetric security schemes to protect embedded device and stakeholder involvement in a powerful permissions and transaction charging structure. It is sufficient for the embedded device to authenticate itself to the server—which knows what operations it is permitted to request and how much it can afford; the device itself needs no such knowledge.

A certificate preferably includes the following data:
start date—the time from which the certificate is valid
end date—the time until which the certificate is valid
a link to a "backing certificate" (described in more detail hereinbelow).
a "revoked" flag—set by the system if the certificate has been revoked.
a "grant on" flag—determines whether the certificate holder is allowed to issue certificates backed by this certificate to other stakeholders, giving them permission to carry out a subset of the operations this certificate authorises. The issuer of the backing certificate chooses whether "grant on" is permissible.
a link to a transaction type—the kind of work the certificate authorises. A hierarchy of certificate types may exist; there might be certificates issued for (i) "all transactions provided by XYZco", (ii) "all transactions provided by Company XYZ for product ABC" and (iii) "Calibrate the meter on an XYZco ABC device". Anywhere where (iii) could legitimately be presented, (i) or (ii) would also be legitimate.
a link to a device or stakeholder identifier—the "holder" of the certificate.

Some certificates in the system may only be issued by the administrators of the server. These are "root certificates" and are distinguished by having no "backing certificate" and implicitly allowing all operations. Root certificates are held by administrators who are able to introduce new devices, stakeholders and accounts into the system.

A certificate may be held by either a stakeholder or "on behalf of" a device.

In order for any request for a certificated transaction type to succeed, there must exist in the system a certificate C such that:
the device identifier presented by the device when the transaction is requested matches that of the certificate C.
the transaction type contained in the certificate C is compatible with the one for which the request is being made.
There must exist a chain of backing links back from the certificate C to one of the set of root certificates in the system (this represents valid delegation of authority).
The start date of all certificates on that chain must be earlier than the time at which the transaction request was received by the server.
The end date of all certificates on that chain must be later than the time at which the transaction request was received by the server.
No certificate on the chain from C to the root certificate may have been revoked.

Constraints on the issue of certificates may ensure that no certificate may be more powerful than that which backs it:
no certificate may have a start date earlier than the time of its issue.
no certificate's validity may start earlier or expire later than that of the certificate that backs it.
no certificate may authorise more transactions than the certificate that backs it (for example, a certificate authorising one type of XYZco transactions may not back a certificate authorising all XYZco transaction types).
no certificate may allow "grant-on" of privileges if the backing certificate does not permit this.

Embodiments of the present invention allow credit to be transferred between device and stakeholder accounts within the server system, in any amount and in either direction, determined by any characteristic of the transaction. This provides content-based and time-based billing.

The transaction mechanism may implement an "open" model for "plug-in" transaction content, allowing arbitrary end-user operations to be incorporated into the transaction tracking and billing framework. For example, this includes data storage: charge by data returned, etc. Each transaction request for a billed transaction must include a reference to a valid account within the system and each billable transaction is linked to an account to receive payment.

The permission model may be extended to encompass billing with the following constraints:
each billable transaction type has associated with it a cost.
there must exist a certificate granting the device making a transaction request permission to draw payment from the referenced device or stakeholder account.
The referenced device or stakeholder account must contain sufficient funds to pay for the transaction at the time it is requested. (i.e. its balance must be at least the current cost associated with the transaction type). If it does, the necessary funds are "escrowed" within the transaction system until completion of the transaction.
A transaction provider may choose to refund some (or all) of the price of the transaction to the requesting device after completion of the transaction. The advertised cost of the transaction that the requesting device must be able to pay can therefore be thought of as a maximum possible cost—sufficient funds must be available when requesting the transaction to cover this. Depending on the performance, success, timeliness, or volume of the transaction the transaction provider may ask the transaction server to return some fraction of the escrowed funds to the requesting device account and only collect the remainder.

Example: a transaction type may exist that normally returns the 100 last temperature readings from a weather station, for a cost of $1.00. If only 50 readings are available, the transaction provider may choose to return the available data, and an indication of only partial success while also refunding a suitable (dynamically-determined) fraction of the cost to the requesting device account.

Transaction providers may have the facility to dynamically change the "maximum"/"advertised" price of transactions within the system based (for example) on criteria such as:

time-of-day
geographical location
a timeliness or volume of data
market demand

It is also permissible for devices to query (using the transaction mechanism itself) the current cost of transaction types so that applications running on them can decide what constitutes the most cost-effective strategy for achieving a particular goal.

A prototype implementation of this permission and billing system uses tables within a relational database to hold the details of device and stakeholder accounts, transaction types and certificates. A Transaction Manager process running on a server computer accepts transaction requests from devices and decodes relevant account and device information, presenting this to an Authentication Manager process that determines whether or not the transaction may proceed, and to an Infrastructure Manager process that determines what code should be executed to fulfil the transaction request. Finally, on completion of the transaction, the Infrastructure Manager process constructs the response (based on the data returned and the success or failure of the transaction) and manages the billing and logging of the transaction.

There is significant benefit to the integration of devices which are capable of taking part in the transaction mechanism described hereinbefore into enterprise-wide information systems—this makes data collected by an embedded device accessible to mainstream business infrastructure and allows data to be sent from such infrastructure to the device. The inventions described below provide an "end-to-end" solution linking complex enterprise database systems to embedded devices through the use of:

transaction management software as described hereinbefore.
software tools to generate code for server, transaction manager and embedded device.

Data in many enterprise information systems is housed in relational databases, often accessed through languages such as the Structured Query Language (SQL) [*C J Date with Hugh Darwen, "A Guide to the SQL Standard: Third Edition, Addison-Wesley,* 1993]. SQL has the advantage that it is standard, portable (many relational database packages use it to define tables and construct queries) and may be integrated into many programming languages and tools. There are many Application Programmer Interfaces (APIs) to SQL. One characteristic these share that is very disadvantageous from the point of view of the resource-constrained embedded programmer is that they typically involve the construction of arbitrary-length textual queries embodying an SQL operation at the client end. The client must also understand the structure of the underlying database and hence may need to be reprogrammed if the structure changes. Given the difficulty of reprogramming potentially millions of embedded devices in the field, an alternative mechanism is clearly needed.

According to a third aspect of the present invention, there is provided a method of accessing a relational database from an embedded computing device by way of an appropriate set of commands, wherein the set of commands comprises an enumerable set of parameterised strings each of which is identified with a transaction ID, and wherein each transaction ID is identified with two format strings, one of which describes a mapping between data supplied by the embedded computing device and the set of commands, and the other of which describes a mapping between fields returned from the relational database and a format readable by the embedded computing device.

According to a fourth aspect of the present invention, there is provided a data processing system comprising at least one embedded computing device, a relational database and a server, wherein the at least one embedded computing device is adapted to request database operations from the relational database by way of an appropriate set of commands, wherein the set of commands comprises an enumerable set of parameterised strings each of which is identified with a transaction ID, and wherein each transaction ID is identified with two format strings, one of which describes a mapping between data supplied by the embedded computing device and the set of commands, and the other of which describes a mapping between fields returned from the relational database and a format readable by the embedded computing device.

The third and fourth aspects of the present invention may be used in conjunction with the first and second aspects, or may stand alone.

Preferably, the set of commands comprises a set of SQL templates. Embodiments of the third and fourth aspects of the present invention seek to enable small embedded devices to interact with SQL databases via a Transaction Manager, as described hereinbefore, without the need for any knowledge of the underlying database language, implementation or design.

The set of SQL interactions a device may request with the server is limited to an enumerable set of parameterised strings each of which is identified with a transaction ID—for example:

| TransactionID | SQL template |
|---|---|
| 1001 | SELECT * FROM MY_TABLE; |
| 1002 | INSERT INTO SOME_TABLE VALUES ($1, $2); |
| 1003 | UPDATE ANOTHER_TABLE SET COST = $2 WHERE DEVICE = $1; |
| more elided . . . | more elided . . . |

It will be noted that there are several placeholder variables (introduced by the dollar character) in some of the queries. These correspond to parameters acquired from the device's transaction request as described below with reference to a mechanism for executing a parameterised transaction.

Device input may be mapped to SQL values, and SQL output may be mapped into target-specific values. Each transaction ID is identified with two "format strings". A format string is a sequence of identifiers each one of which describes the way in which one data item may be represented. One of these format strings may describe the mapping between data supplied by the device, and printable SQL representations that will be inserted into the transaction's template SQL statement. The other format string may describe a mapping between fields returned by the SQL query and a format readable by the device. Examples of operators in the format string include, but are not limited to:

convert a 2-byte unsigned integer into an ASCII string representing that integer.
convert the strings "YES" or "NO" into a one-byte boolean, 0 for "NO" and 1 for "YES".
convert a 32-bit unsigned integer representing seconds since 00:00 Jan. 1, 1970 into a date of the form Thursday Jun. 27, 2000, 15:37:00".

The use of format strings to assist with the packing and unpacking of data is inspired by discussion in Brian W Kernighan and Rob Pike, "*The Practice of Programming*", Addison-Wesley, 1999.

There now follows an example of a mechanism for executing transactions.

It is assumed that the device has made a valid transaction request for an SQL transaction (so the transaction manager knows the SQL template and the input and output format strings) and the "payload" of the transaction request is available as input to the algorithm described.

It is assumed in the following discussion that format strings and templates are "well-formed" with respect to each other—i.e. the same number of format identifiers.

A simple mechanism for executing such a parameterised transaction can be described concisely as:

```
for all rows of data presented on the input
    fill in the sql template with data read from the input
    according to the input format string
    execute the resulting statement
    for all rows in the output of the SQL statement
        use the output format string to add to a response
    end
end
send the response
Or, in more detail:
while (data still present in payload)
do
    move to start of input format string
    create local copy of SQL format string
    move to first placeholder in SQL template string
    while (not at end of input format string)
    do
        case (current format indicator) is
            indicator for first supported data type =>
                read appropriate number of bytes for
                    datatype 1
                convert to printable SQL representation of
                    this value
                replace placeholder in local copy of
                    template SQL string with this data
            indicator for second supported data type =>
                -- & so on for each supported data type;
                    details elided
            -- cases for other data types elided
        end case;
        skip to next SQL placeholder;
        skip to next format indicator;
    end while;
    -- by now all placeholders in the local copy of the SQL format
    -- string will be filled in with values derived from the input
    -- data
    send local copy of SQL string to database and collect output;
    while (more rows still present in SQL output)
    do
        move to start of output format string
        move to first field in returned row
        while (not at end of output format string)
        do
            case (current format indicator) is
                indicator for first supported data type =>
                    convert returned data to target
                        representation
                    pack into payload of response
                indicator for second supported data type =>
                    -- & so on; details elided
                -- cases for other data types elided
            end case;
            skip to next format indicator;
            skip to next field in returned row;
        end while;
        skip to next row in SQL output;
    end while;
end while;
send response payload back to requesting device;
```

According to a fifth aspect of the present invention, there is provided a method of requesting database operations from a relational database by making transaction requests from an embedded computing device by way of a server, wherein:

i) each database operation is associated with a transaction identifier and a template, the template being held only on the server and describing the database operation in a language acceptable to the database;
 ii) the template includes placeholders that may be filled in by variables derived from a transaction request;
 iii) each database operation is associated with first and second format strings held only on the server;
 iv) the first format string is an input format string containing a list of commands that are interpreted when a transaction request is received, each command in the list being an instruction to translate one field of data presented by the embedded computing device in its own native format into a representation that may be used to fill in the placeholders and thus to instantiate the template, which is then passed to the relational database as an executable command;
 v) the second format string is an output format string containing a list of commands that are interpreted when data are returned from the database as a result of the executable command of step iv), each command in the list being an instruction to translate one field of data returned from the database into a format comprehensible by the embedded computing device; and
 vi) each transaction request comprises a transaction identifier sent by the embedded computing device, followed by a set of parameters that are used to fill in the placeholders in the template.

According to a sixth aspect of the present invention, there is provided a data processing system comprising at least one embedded computing device, a server and a relational database, wherein the at least one embedded computing device is adapted to request database operations from the relational database by making transaction requests by way of the server, wherein:

i) each database operation is associated with a transaction identifier and a template, the template being held only the server and describing the database operation in a language acceptable to the database;
 ii) the template includes placeholders that may be filled in by variables derived from a transaction request;
 iii) each database operation is associated with first and second format strings held only on the server;
 iv) the first format string is an input format string containing a list of commands that are interpreted when a transaction request is received, each command in the list being an instruction to translate one field of data presented by the embedded computing device in its own native format into a representation that may be used to fill in the placeholders and thus to instantiate the template, which is then passed to the relational database as an executable command;
 v) the second format string is an output format string containing a list of commands that are interpreted when data are returned from the database as a result of the executable command of step iv), each command in the list being an instruction to translate one field of data returned from the database into a format comprehensible by the embedded computing device; and
 vi) each transaction request comprises a transaction identifier sent by the embedded computing device, followed by a set of parameters that are used to fill in the placeholders in the template.

The fifth and sixth aspects of the present invention may be used in conjunction with the first and second aspects, or may stand alone.

The fifth and sixth aspects of the present invention are closely related to the third and fourth aspects, and the description in relation to the third and fourth aspects applies also to the fifth and sixth aspects. For the sake of clarity and support, the fifth and sixth aspects of the present invention will now be further described.

Various types of complex database operations and their inputs and outputs may be requested and returned in a way that does not require the requesting embedded computing device to understand anything about the underlying languages or formats used by the database when it makes a request—it only needs to be aware of simple transaction identifiers.

Each database operation is associated with a transaction ID and a "template" held only on the server describing the operation in a language acceptable to the database. This "template" contains placeholders that will be filled in by variables derived from the transaction request.

Each operation is associated with two "format strings" held only on the server. The first of these (the "input format string") contains a list of commands that are interpreted when a transaction request is received. Each command in the string is an instruction to translate one field of data presented by the device in its own native format to a representation that can be used to fill in the placeholders in the template.

The data supplied by the device are decoded according to the "input format string" and used to fill in the placeholders in the template. The instantiated template is then sent to the underlying database software running on the server as an executable command.

The second of these format strings (the "output format string") contains a list of commands that are interpreted once for each row of data returned by the database operation. Each command in the string is an instruction to translate one field of data returned by the execution of the database command into a format comprehensible by the requesting device.

A transaction request in this scheme consists of the device sending the transaction identifier followed by a set of parameters that will be used to fill in the placeholders—these may be sent in whatever data format is suitable to the embedded device as the Input Format String will translate these into a format usable by the database (for example, a two's-complement signed binary representation of the integer 123 would be translated to the string "123").

A transaction response in this scheme consists of the server sending the results of the query as a set of rows each encoded in a format comprehensible by the device—the Output Format String translates the results of the query from that returned by the database to one comprehensible by the device.

For example:

Assume there is a table that contains two fields, an integer corresponding to a device identifier and another integer corresponding to some datum recorded by that device.

Assume also that retrieving the data generated by a particular device is identified with Transaction 100.

Assume that the template for Transaction 100 is "SELECT*FROM MY_TABLE WHERE ID=$1"

Assume that the input format string for Transaction 100 is "I" (which means "accept one parameter from the input; map an integer in the binary format used by the device to a printable string representation and replace the next placeholder with the value".

Assume that the output format string for Transaction 100 is "II" which means "accept two parameters per row from the output, and translate both of these into integers.

The request for data returned by device 123 would be:

<100><123> (where <X> represents the device's native binary representation of the corresponding integer)

The <100> would be used to look up the template and format strings.

A process would then construct an instantiation of the template:

SELECT*FROM MY_TABLE WHERE ID=123 and cause the database to execute this. Assume that the database returns:
"123", "10000"
"123", "10040"
"123", "20000"

The output format string would be applied to each row to construct the response:

<123><10000><123><10040><123><20000>.

Note that no field or record delimiters are sent—it is assumed that the device making the transaction request has been programmed to expect data in a simple binary format.

For a better understanding of the present invention and to show how it may be carried into effect, reference shall now be made by way of example to the accompanying drawings, in which:

DETAILED DESCRIPTION OF THE DRAWINGS

Figure 1:
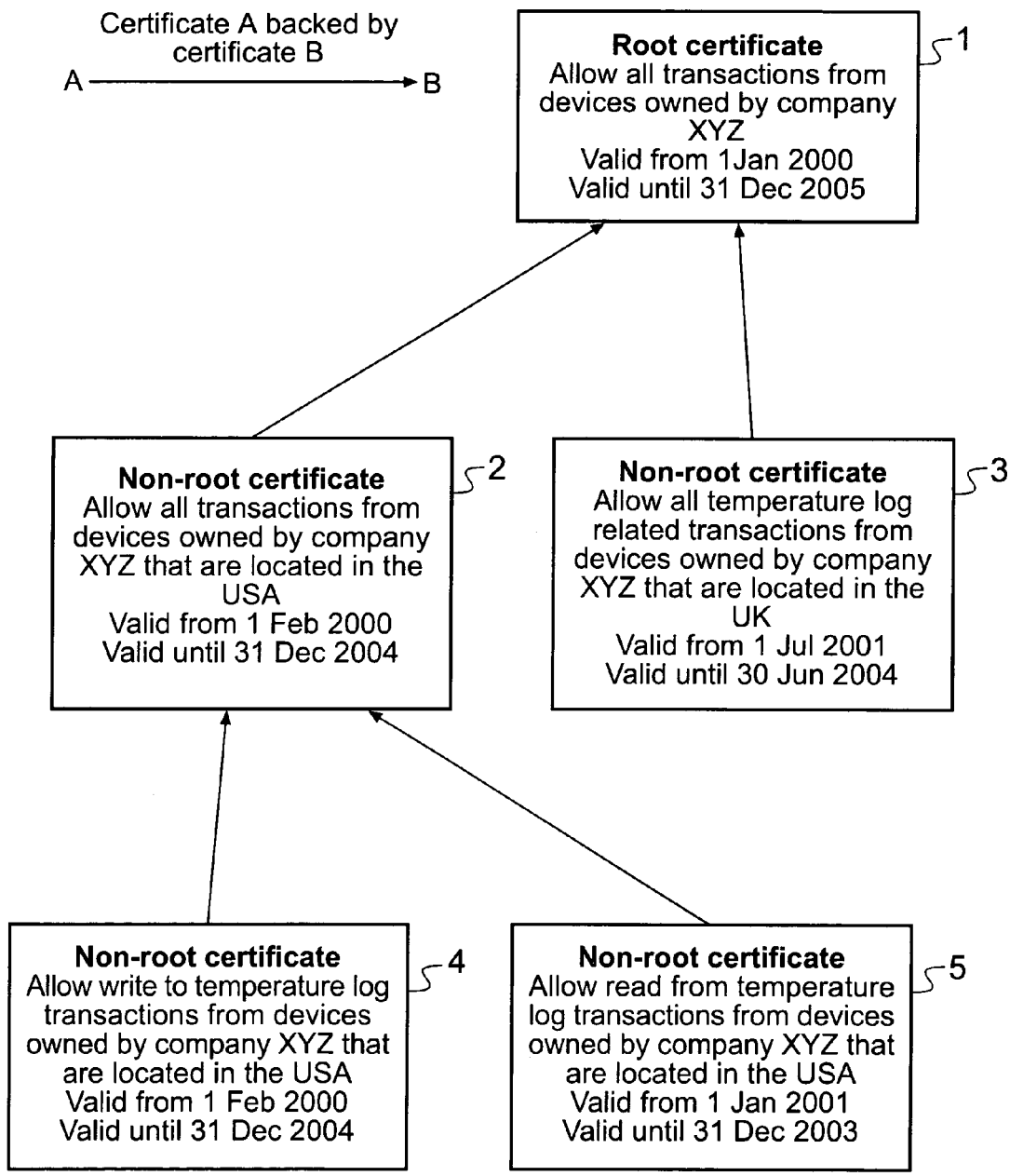
FIG. 1 shows an example of a hierarchy of certificates.

Referring firstly to FIG. 1, there is shown a root certificate 1 allowing all transactions from all devices owned by company XYZ, the root certificate 1 having a start (i.e. "valid from") date of Jan. 1, 2000 and an end (i.e. "valid to") date of Dec. 31, 2005. The root certificate 1 can only be issued by a systems administrator and does not have any backing certificate (see below).

Two first-layer non-root certificates 2 and 3 are each directly backed by the root certificate 1. Non-root certificate 2 allows all transactions from all devices owned by company XYZ that are located in, say, the United States of America. Certificate 2 has a start date of Feb. 1, 2000 and an end date of Dec. 31, 2004. Non-root certificate 3 allows all transactions from all devices owned by company XYZ that are located in, say, the United Kingdom. Certificate 3 has a start date of Jul. 1, 2000 and an end date of Jun. 30, 2004. It is to be noted that the transactions allowed by non-root certificates 2 and 3 are subsets of the global set of transactions allowed by the root certificate 1. Furthermore, the validity dates of each of non-root certificates 2 and 3 are within the range of validity dates of the root certificate 1. A global systems administrator will generally hold the root certificate 1, and will be empowered to issue non-root certificates 2, 3 to local systems administrators based, in this example, respectively in the USA and the UK, the non-root certificates 2, 3 each being backed by the root certificate 1.

The non-root certificate 2 is shown to be backing two second-layer non-root certificates 4, 5. Non-root certificate 4 allows "write to temperature log" transactions from devices owned by company XYZ that are located in the USA, the certificate being valid from Feb. 1, 2000 to Dec. 31, 2004. Non-root certificate 5 allows "read from temperature log"

transactions from devices owned by company XYZ that are located in the USA, the certificate being valid from Jan. 1, 2001 to Dec. 31, 2003. It will be appreciated that the permissions granted by certificates 4, 5 are subsets of the permissions granted by certificate 2, which in turn form a subset of the permissions granted by the root certificate 1.

Further layers of the hierarchy may provide certificates permitting transactions with, for example, a particular subset of devices (e.g. vending machines) located within a given territory. Further examples will be apparent to the skilled reader.

Figure 2:
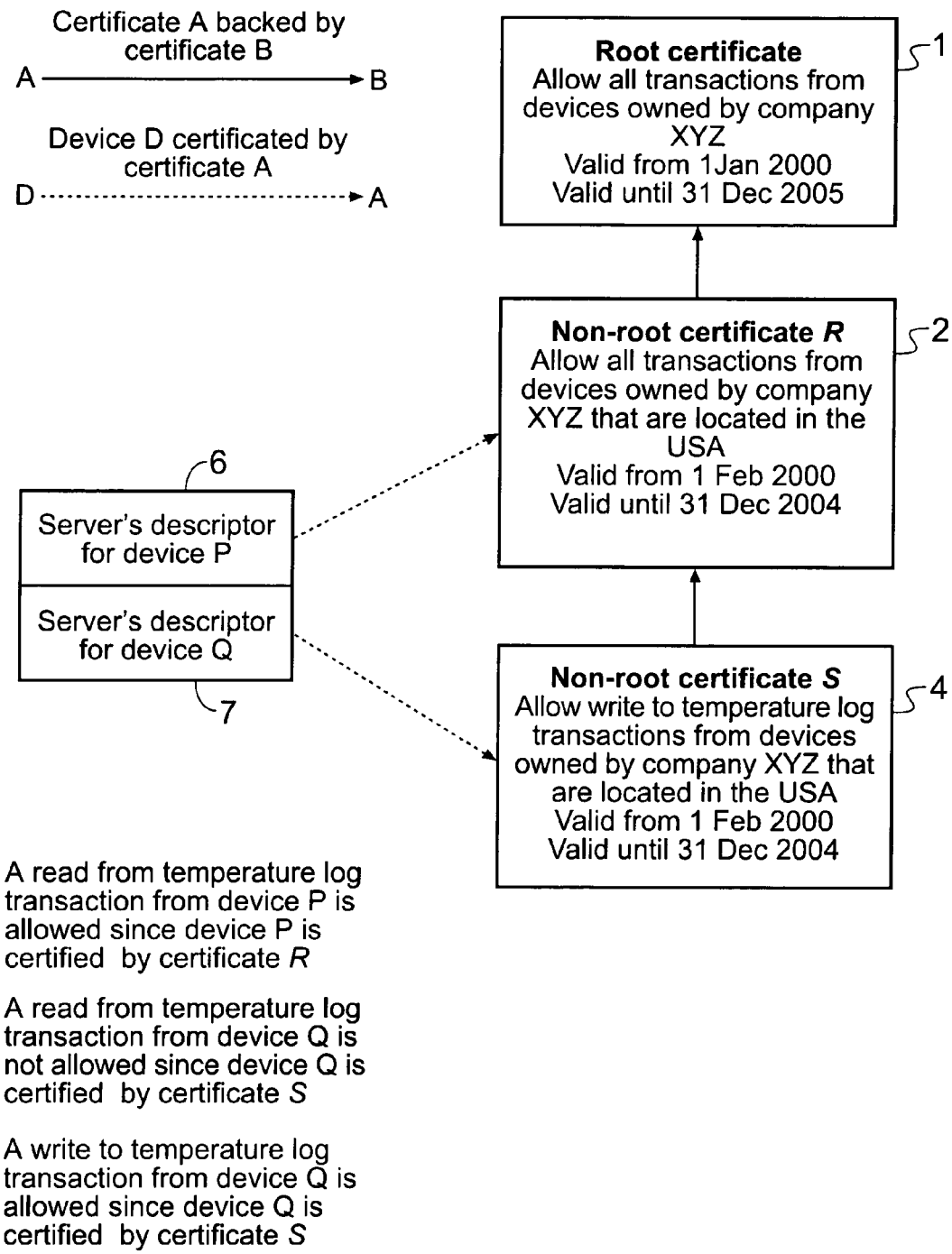
FIG. 2 shows an example of transaction permission checking.

FIG. 2 shows an example of transaction permission checking in accordance with an embodiment of the present invention. As in FIG. 1, there is provided a root certificate 1 allowing all transactions from all devices owned by company XYZ, the root certificate 1 having a start (i.e. "valid from") date of Jan. 1, 2000 and an end (i.e. "valid to") date of Dec. 31, 2005. Again, as in FIG. 1, the root certificate 1 is backing a non-root certificate 2 allowing all transactions from all devices owned by company XYZ that are located in the United States of America, non-root certificate 2 having a start date of Feb. 1, 2000 and an end date of Dec. 31, 2004. Non-root certificate 2 in turn backs a further non-root certificate 4 allowing "write to temperature log" transactions from devices owned by company XYZ that are located in the USA, the certificate being valid from Feb. 1, 2000 to Dec. 31, 2004. FIG. 2 also shows two devices 6 and 7 (shown here in terms of server descriptors). Device 6 is certificated by certificate 2, whereas device 7 is certificated by certificate 4. In this example, a "read from temperature log" transaction from device 6 is allowed, since device 6 is certified by certificate 2 (allowing all transactions from devices owned by company XYZ in the USA). However, a "read from temperature log" transaction from device 7 is not allowed, since device 7 is only certified by certificate 4 (only allowing "write to temperature log" transactions from devices owned by company XYZ in the USA). However, a "write to temperature log" transaction from device 7 is allowed, since this is permitted by certificate 4.

Figure 3:
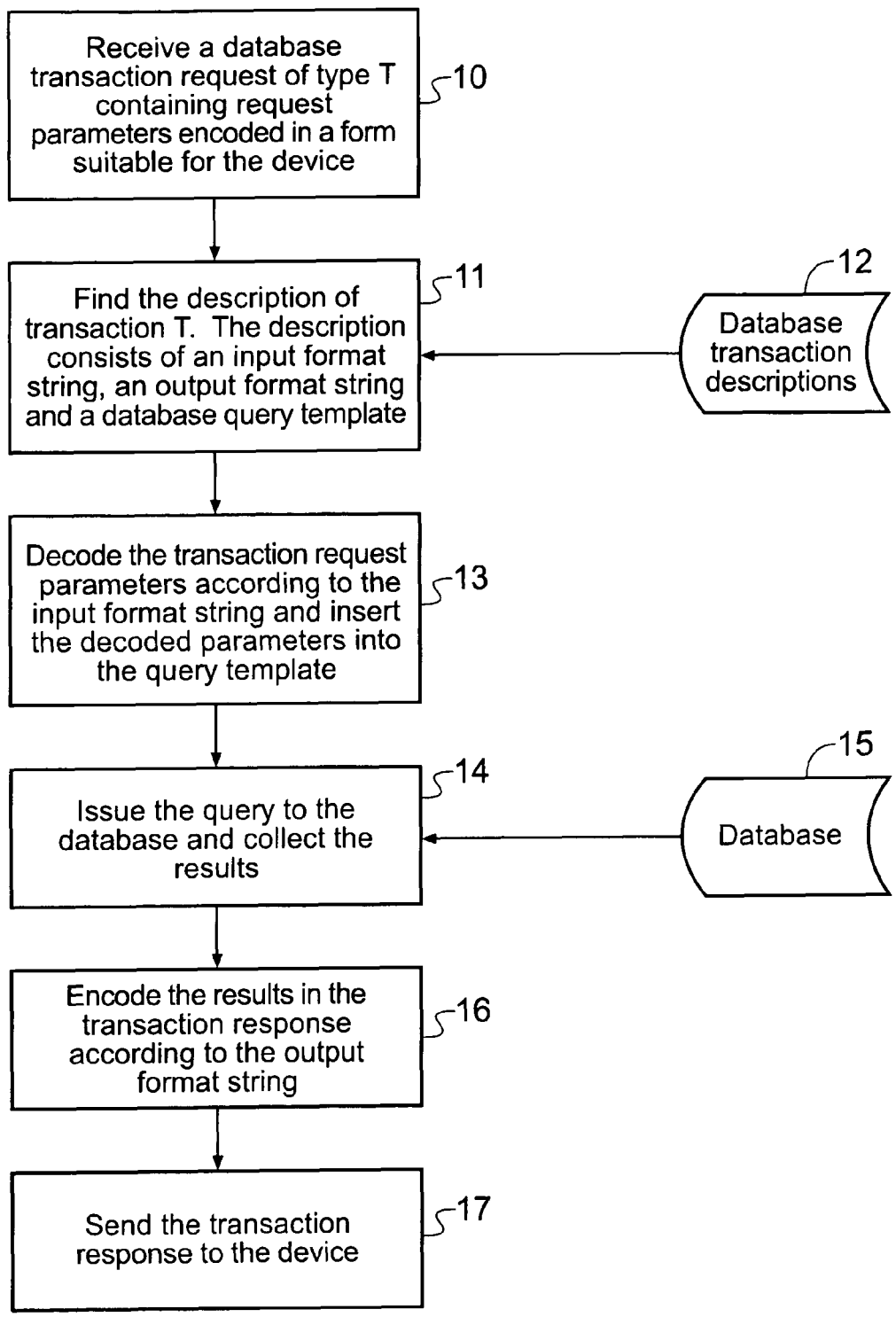
FIG. 3 shows an example of processing a database query transaction.

FIG. 3 shows an example of processing a database query transaction (operation) in accordance with an embodiment of the fifth and sixth aspects of the present invention. At step 10, a database transaction request of type T (its transaction identifier) is received from an embedded device by a server. The request contains request parameters encoded in a format understood by the embedded device. At step 11, a description of transaction request type T is located and selected from a library 12 of database transaction descriptions held on the server. The description includes an input format string, and output format string and a database query template. The transaction request parameters are decoded at step 13 according to the input format string, and the decoded parameters are then inserted into the database query template. When the database query template has been filled in, a query can be sent at step 14 to relational database 15, and results from the database are then returned before being encoded at step 16 in a transaction response according to the output format string. Finally, at step 17, the transaction response is returned to the embedded device in a format understood by the embedded device.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

| Glossary | |
|---|---|
| API | "Application Programmer Interface"—the set of functions made available by a software component to a programmer wishing to make use of the services it provides. |
| checksum | a simple calculation performed over data to provide indication of corruption; when a system receives checksummed data it recalculates the checksum itself and if there is any discrepancy some error indication is raised. |
| datalink | the medium over which TCP/IP data is being transmitted |
| FTP | File Transfer Protocol, a mechanism of moving files between computers, typically implemented on top of the Transmission Control Protocol |
| HTTP | Hypertext Transfer Protocol, the protocol used to serve World Wide Web pages. Typically layered on top of the Transmission Control Protocol |
| Internet | formally, any structure formed of two or more networks on which computers speak the Internet Protocol. Informally, the world-wide agglomeration of such networks. |
| IP | the Internet Protocol |
| Microcontroller | a (typically small) microprocessor intended for use in control applications, with some on-board ROM, RAM and input/output devices. |
| MTU | Maximum Transmission Unit; the maximum length of a TCP/IP segment. This varies over different datalinks. |
| NAK | "Negative Acknowledge"—to refuse an offered option |
| PPP | the Point-to-Point protocol—a means of encapsulating and transmitting various networking protocols including the Internet Protocol suite over datalinks including asynchronous serial communication lines |
| RAM | Random Access Memory: "working store" in a computer system whose content may be both read and written during program execution |
| ROM | Read Only Memory: memory whose content may not be changed by program execution |
| segment | the unit of TCP/IP transmission; a packet of information containing host, destination and protocol information and a "payload" of data. |
| SQL | Structured Query Language, a means of describing and querying database systems |
| TCP | Transmission Control Protocol—a reliable end-to-end protocol layered on top of the Internet Protocol (IP) |
| TCP/IP stack | the suite of software allowing a computer to connect to the Internet |
| UDP | a User Datagram Protocol layered on top of the Internet Protocol |

The invention claimed is:

1. A method of enabling transaction activities by networked computing devices comprising:
   providing each device being connected to at least one server and associated with at least one stakeholder, wherein each device and each stakeholder has a unique identifier, and wherein a plurality of electronic certificates are provided, each owned by a stakeholder or on behalf of a device, the certificates being held on the at least one server and comprising a data structure which, when interpreted by the at least one server, determines whether a particular device acting on behalf of a particular stakeholder is entitled to carry out a transaction:
   accessing a relational database from an embedded computing device by way of an appropriate set of commands, wherein the set of commands comprises an enumerable set of parameterized strings of commands each of which is identified with a transaction ID, wherein each transaction ID is identified with two format strings of commands, one of which describes a mapping between data supplied by the embedded computing device and the set of commands, and the other of which describes a mapping between fields returned from the relational database and a format readable by the embedded computing device;

associating database operations with first and second format strings held only on the server, wherein the first format string is an input format string containing a list of executable commands that are interpreted when a transaction request is received, each server supplied executable command in the list being an instruction to translate one field of data presented by the embedded computing device in its own native format into a representation that is used to fill in the placeholders and thus to instantiate the template;

then passing the executable commands to the relational database as translated executable commands, and wherein the second format string is an output format string containing a list of server supplied commands that are interpreted when data is returned from the database as a result of the executable commands.

2. A method according to claim 1, further including:

requesting database operations from a relational database by making transaction requests from an embedded computing device by way of a server, and wherein:

i) each database operation is associated with a transaction identifier and a template, the template being held only on the server and describing the database operation in a language acceptable to the database;

ii) the template includes placeholders that may be filled in by variables derived from a transaction request;

iii) each command in the list being an instruction to translate one field of data returned from the database into a format comprehensible by the embedded computing device; and iv) each transaction request comprises a transaction identifier sent by the embedded computing device, followed by a set of parameters that are used to fill in the placeholders in the template.

3. A method of accessing a relational database from an embedded computing device by way of an appropriate set of commands comprising:

providing the set of commands including an enumerable set of parameterised strings of commands each of which is identified with a transaction ID;

identifying each transaction ID with two format strings of commands, one of which describes a mapping between data supplied by the embedded computing device in its own native format;

then passing the set of commands to the relational database as executable commands, and the other of which describes a mapping between fields returned from the relational database as a result of the executable commands in a format readable by the embedded computing device.

4. A method according to claim 3, further comprising:

requesting database operations from the relational database by making transaction requests from the embedded computing device by way of a server, and wherein:

i) each database operation is associated with a transaction identifier and a template, the template being held only on the server and describing the database operation in a language acceptable to the database;

ii) the template includes placeholders that may be filled in by variables derived from a transaction request;

iii) each database operation is associated with first and second format strings held only on the server;

iv) the first format string is an input format string containing a list of executable commands that are interpreted when a transaction request is received, each command in the list being an instruction to translate one field of data presented by the embedded computing device in its own native format into a representation that may be used to fill in the placeholders and thus to instantiate the template;

v) the second format string is an output format string containing a list of executable commands that are interpreted when data are returned from the database as a result of the executable command of step iv), each command in the list being an instruction to translate one field of data returned from the database into a format comprehensible by the embedded computing device; and vi) each transaction request comprises a transaction identifier sent by the embedded computing device, followed by a set of parameters that are used to fill in the placeholders in the template.

5. A data processing system comprising at least one embedded computing device, a relational database and a server, wherein the at least one embedded computing device requests database operations from the relational database by way of an appropriate set of commands, wherein the set of commands comprises an enumerable set of parameterised strings of commands each of which is identified with a transaction ID, and wherein each transaction ID is identified with two format strings of commands, one of which describes a mapping between data supplied by the embedded computing device in its own native format and the set of commands which are then passed to the relational database as executable commands, and the other of which describes a mapping between fields returned from the relational database as a result of the executable commands and a format readable by the embedded computing device.

6. A system as claimed in claim 5, wherein the at least one embedded computing device is adapted to request database operations from the relational database by making transaction requests by way of the server, and wherein:

i) each database operation is associated with a transaction identifier and a template, the template being held only on the server and describing the database operation in a language acceptable to the database;

ii) the template includes placeholders that may be filled in by variables derived from a transaction request;

iii) each database operation is associated with first and second format strings held only on the server;

iv) the first format string is an input format string containing a list of commands that are interpreted when a transaction request is received, each command in the list being an instruction to translate one field of data presented by the embedded computing device in its own native format into a representation that may be used to fill in the placeholders and thus to instantiate the template;

v) the second format string is an output format string containing a list of commands that are interpreted when data are returned from the database as a result of the executable command of step iv), each command in the list being an instruction to translate one field of data returned from the database into a format comprehensible by the embedded computing device; and vi) each transaction request comprises a transaction identifier sent by the embedded computing device, followed by a set of parameters that are used to fill in the placeholders in the template.

7. A method of enabling transaction activities by networked devices, said method comprising:

connecting each device to at least one server and associated with at least one stakeholder;

providing each device and each stakeholder with a unique identifier;

providing a plurality of electronic certificates each owned by a stakeholder or on behalf of a device, the certificates being held on the at least one server and comprising a data structure;

interpreting the certificates by the at least one server to determine whether a particular device acting on behalf of a particular stakeholder is entitled to carry out a transaction;

accessing a relational database from an embedded computing device by way of an appropriate set of commands, wherein database operations are associated with first and second format strings of commands held by the at least one server, wherein the first format strings of commands describe a mapping between data supplied by the device and printable Structured Query Language (SQL) representations, and wherein the second format strings of commands describe a mapping between fields returned by SQL queries and a format readable by the device.

8. A method according to claim 7, further comprising:

providing operators in at least one of the first and second format strings having at least one of (i) a conversion between an unsigned integer and an ASCII string representing the unsigned integer; (ii) a conversion between strings and a one-byte Boolean; and (iii) a conversion between an unsigned integer and a date.

* * * * *